United States Patent
Anthapadmanabhan et al.

(10) Patent No.: US 9,634,761 B2
(45) Date of Patent: Apr. 25, 2017

(54) APPARATUS AND METHOD FOR OPTICAL-NETWORK MONITORING

(71) Applicants: Alcatel-Lucent USA Inc., Murray Hill, NJ (US); Alcatel-Lucent Deutschland AG, Stuttgart (DE)

(72) Inventors: Nagaraj Prasanth Anthapadmanabhan, Bridgewater, NJ (US); Joerg Hehmann, Weil der Stadt (DE); Michael Straub, Maulbronn (DE)

(73) Assignee: Alcatel Lucent, Boulogne-Billancourt (FR)

( * ) Notice: Subject to any disclaimer, the term of this patent is extended or adjusted under 35 U.S.C. 154(b) by 145 days.

(21) Appl. No.: 14/502,535

(22) Filed: Sep. 30, 2014

(65) Prior Publication Data
US 2015/0295641 A1    Oct. 15, 2015

Related U.S. Application Data

(60) Provisional application No. 61/978,453, filed on Apr. 11, 2014.

(51) Int. Cl.
*H04B 10/08*    (2006.01)
*H04B 10/079*    (2013.01)
(Continued)

(52) U.S. Cl.
CPC .......... *H04B 10/079* (2013.01); *H04B 10/27* (2013.01); *H04Q 11/0067* (2013.01); *H04B 10/0775* (2013.01); *H04Q 2011/0083* (2013.01)

(58) Field of Classification Search
CPC .................................. H04B 10/0775
(Continued)

(56) References Cited

U.S. PATENT DOCUMENTS 5,321,541 A * 6/1994 Cohen .................. H04B 10/038
398/144
6,304,350 B1 * 10/2001 Doerr ................... H04B 10/506
372/23

(Continued)

FOREIGN PATENT DOCUMENTS

DE  WO 2012154388 A1 * 11/2012 ......... H04Q 11/0067
WO     2012154388 A1    11/2012

OTHER PUBLICATIONS

PCT/US2015/024966 Notification of Transmittal of the International Search Report and the Written Opinion of the International Searching Authority, or the Declaration dated Jul. 29, 2015.

*Primary Examiner* — Ken N Vanderpuye
*Assistant Examiner* — Jai Lee
(74) *Attorney, Agent, or Firm* — Stephen J. Wyse

(57) ABSTRACT

A method, apparatus, and system for network monitoring, and more specifically for correlating downstream devices in an optical network with downstream ports of an optical splitter through which they are communicating with a central office. The downstream devices operational on the network are indentified and listed in a correlation table. Selected subsets of these devices are then monitored, preferably by an ISM under the direction of a management node, in a series of monitoring cycles until a satisfactory correlation may be achieved. The correlation cycle may be performed at startup, as needed, or on a periodic basis.

16 Claims, 5 Drawing Sheets

(51) Int. Cl.
*H04B 10/27* (2013.01)
*H04Q 11/00* (2006.01)
*H04B 10/077* (2013.01)

(58) Field of Classification Search
USPC .......................................................... 398/35
See application file for complete search history.

(56) References Cited

U.S. PATENT DOCUMENTS

| | | | |
|---|---|---|---|
| 7,177,540 B2 * | 2/2007 | Inoue | H04J 14/0221 398/16 |
| 7,526,200 B2 * | 4/2009 | Nakano | H04B 10/506 398/10 |
| 8,238,762 B2 * | 8/2012 | Rasztovits-Wiech | H04B 10/66 398/209 |
| 8,428,456 B2 * | 4/2013 | Zheng | H04J 14/0282 398/2 |
| 8,559,816 B2 * | 10/2013 | Zheng | H04B 10/2504 398/17 |
| 2002/0110245 A1 * | 8/2002 | Gruia | H04L 9/12 380/278 |
| 2008/0317462 A1 * | 12/2008 | Chi | H04B 10/0793 398/13 |
| 2011/0085795 A1 * | 4/2011 | Ozaki | H04J 14/0282 398/25 |
| 2012/0155858 A1 * | 6/2012 | Ozaka | H04L 12/2861 398/24 |
| 2012/0288273 A1 * | 11/2012 | Pohlmann | H04Q 11/0067 398/9 |
| 2013/0183035 A1 * | 7/2013 | Smith | H04Q 11/0005 398/48 |

* cited by examiner

APPARATUS AND METHOD FOR OPTICAL-NETWORK MONITORING

CROSS-REFERENCE TO RELATED APPLICATIONS

The present disclosure is related to and claims priority from U.S. Provisional Patent Application Ser. No. 61/978,453, entitled Splitter Monitoring in Optical Access Network and filed on 11 Apr. 2014, and is related to U.S. patent application Ser. No. 13/106,088, entitled Intelligent Splitter Monitor and filed on 12 May 2011, the entire contents of which are incorporated by reference herein.

TECHNICAL FIELD

The present invention relates generally to the field of communication networks, and, more particularly, to a method and apparatus for associating optical splitter ports in an optical communication network with CPEs or other end devices.

BACKGROUND

The following abbreviations are herewith expanded, at least some of which are referred to within the following description of the state-of-the-art and the present invention.
CPE Customer Premises Device
ISM Intelligent Splitter Monitor
NA Network Analyzer
OLT Optical Line Termination
OMM Optical Monitoring Module
ONT Optical Network Terminal
ONU Optical Network Unit
PIC Photonic Integrated Circuitry
PLOAM Physical Layer Operations, Administration, and Maintenance Many optical communication networks use a point to multipoint topology, for example a PON (passive optical network). In one example, a PON includes an OLT (optical line terminal) located in a CO (central office) that connects with a downstream optical splitter, which is usually remote from the CO, via a feeder fiber. The optical splitter in turn connects with a number of PON end devices such as ONUs (optical network units) via a corresponding number of access fibers. An optical splitter may also connect at one or more of its downstream ports to another optical splitter instead of an end device creating a cascaded topology. Similar topologies may be used for optical networks in other implementations, for example data centers.

In a PON, downstream transmissions from the OLT pass through the one or more optical splitters to the ONUs or other end devices. In most cases each end device receives the same transmission and extracts the portion intended for it. Upstream transmissions from the end devices, in a PON sometimes referred to as CPEs (customer premises equipment), use the same fiber and splitter path as downstream transmissions.

An ISM (intelligent splitter monitor) may be installed in the optical network. In a typical configuration, the downstream ports of one or more optical splitters are monitored to determine when an upstream transmission has arrived at a specific port. This may be facilitated by, for example, a tap coupling on the fiber or other communication channel connected at the downstream optical-splitter port. Downstream transmissions may be similarly monitored as well, although presently this is considered unnecessary.

Note that the techniques or schemes described herein as existing or possible are presented as background for the present invention, but no admission is made thereby that these techniques and schemes were heretofore commercialized, or known to others besides the inventors.

SUMMARY

With the goal of providing a more energy-efficient optical communication network, inventors have developed an ISM (intelligent splitter monitor) and herein disclose certain inventive aspects of it and the operation thereof. Note, however, that while an improvement in efficiency is expected through the application of these new ideas, no particular result is a requirement of the present invention unless explicitly recited in a particular claim.

In one aspect, a method of network monitoring includes providing an ISM associated with at least one optical splitter in an optical network, for example a PON, or employing an existing ISM. The ISM should configured to be able to monitor a set, and preferably all, of the downstream ports of the associated at least one optical splitter for upstream traffic. The monitoring of each downstream port may be accomplished, for example, using a tap coupler on the optical channel downstream if the splitter. In general the method applies to the mapping of monitored ports, but unmonitored ports may in some instances be mapped by the process of elimination.

In this aspect, the method includes determining which end devices are communicating on the optical network, which is often though not necessarily done in the course of normal operation even if the mapping of the end devices to specific splitter ports is unknown. A table or similar device is established or populated with all of the currently reporting end devices and provision is made for incrementally associating or disassociating each end device with each known splitter port. In some cases the status of splitter ports as monitored or unmonitored is also determined and recorded. If any end devices may at this time be associated or disassociated with specific splitter ports or groups of splitter ports that may be recorded at this point as well.

In this aspect the method includes selecting a plurality of the end devices and directs other end devices communicating on the network to cease upstream communications, either until being further directed or for definite or calculable period of time. The selected plurality of CPEs may then be instructed to commence upstream communications, although in many implementations the process may simply rely on standard upstream communications without further instruction.

The activity of the downstream splitter ports is then monitored, and in the table or similar device the unselected end devices are disassociated with the monitored ports that the ISM apparatus reported active during the monitoring cycle. When the monitoring has proceeded long enough for this to occur, the silenced CPE may be allowed to resume communication.

In some embodiments, a determination may then be made as to whether each end devices has been uniquely associated with a monitored (or in some cases, unmonitored) splitter port. If all (or all desired) end devices have been associated with a splitter port, the process may be terminated. Once terminated, the correlation cycle may be re-executed, for example, on a periodic basis or re-initiated upon the occurrence of an event.

In these embodiments, if it is determined that the association of end devices to splitter ports is not complete or at an acceptable level, then the process continues with the selection of an additional plurality of splitter ports. The additional plurality of end devices should not be identical in composition with a previously selected plurality. (This is not prohibited, but as it would be likely to produce the same association result after monitoring, in most cases it would be inefficient.)

In these embodiments, once the additional plurality of end devices is selected, then the remaining end devices are directed to cease upstream transmission and the monitoring, reporting, and associating or disassociating steps are performed. The determination of the level of association is then repeated and the process either terminates or continues with the selections of a new additional plurality of end devices.

In most implementations the number of end devices to be associated will be greater than three or four, and the number of additional pluralities selected for monitoring will depend on the number of end devices. A preferred method of selecting the CPEs, however, will usually keep the number of monitoring cycles to a minimum.

In a preferred method of monitoring an optical network having a plurality of downstream devices in optical communication with a network node via an optical splitter, the method includes selecting a plurality of subsets of downstream devices. In a preferred embodiment, each subset of the plurality of subsets has in it more than one but less than all of the downstream devices in a collective-monitoring set consisting of at least a portion of the plurality of downstream devices and in addition any dummy downstream devices necessary to give the set $2^n$ members, wherein n is a positive integer.

In this embodiment, a plurality of port monitoring cycles may then be executed, with each cycle applying a subset of the plurality of subsets. In this embodiment, each executed port monitoring cycle includes directing un-selected downstream devices to cease upstream transmissions and monitoring upstream activity on downstream splitter ports to determine which ports are receiving upstream transmissions. The method further includes reporting the monitoring results. The reporting is performed at the end of each monitoring cycle, at the conclusion of all the monitoring cycles, or at some other time according to the needs of a particular implementation.

In this embodiment, a table or similar device may be updated with the reported results and the unselected end devices are disassociated with the monitored ports that the ISM apparatus reported active during the monitoring cycle. When the monitoring has proceeded long enough for this to occur, the silenced downstream devices may be allowed to resume communication.

In some embodiments the selecting of a plurality of subsets of downstream devices includes selecting a first subset having one group comprising the one-half of the downstream devices in the collective-monitoring set, wherein a group is one or more downstream devices that are adjacent to each other in a sequential listing of devices in the collective-monitoring set, and then selecting subsequent subsets by selecting groups of one-half the size of the group or groups of the previous subset, each group consisting of one-half of each previously selected group or one-half of each previously unselected group until $\log_2(n)$ subsets have been selected.

In some embodiments of the method, individual subsets having only one downstream device as a member may be selected and individual monitoring cycles be executed if necessary to complete a correlation cycle.

In another aspect, an ISM includes a photodiode array and a microcontroller arranged such that the activation of a photodiodes can be reported by the microcontroller. The microcontroller may include or be connected to a transmitter for this purpose. When installed in an optical access network, the photodiodes in the array are operatively associated with respective ports of a network optical splitter and such that the photodiode is activated by an upstream signal from a downstream device directed toward the port associated with the photodiode.

In this aspect the microcontroller may also include or be connected to a receiver for receiving, for example, management signals directed at the microcontroller. In a preferred embodiment, the ISM includes a power source such as a rechargeable battery. For remote operation, a photocell may be provided to convert a received optical signal into electrical power for storage in the rechargeable battery. A power controller may be used to direct electrical power from the photocell to the battery and to the microcontroller as needed.

In operation, photodiodes are optically connected to the respective optical channels between the optical splitter and the downstream devices. Note these channels may be implemented in actual fiber and fiber connectors, but are advantageously implemented partially or completely in semiconductor chips such as a PIC.

In order to identify which downstream devices are associated with which splitter ports, some of the downstream devices are selectively turned off or silenced while others are instructed to transmit. A standard measurement operation works well for this purpose. A network node may include a management module for determining which devices are to be monitored in a given monitoring cycle and a number of monitoring cycles may be executed in a given correlation cycle. The network node may also receive reported monitoring results and update a correlation table to facilitate the correlation process. The network node may be implemented in, for example, an OMM (optical monitoring module) or a network analyzer or a combination or both.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Embodiments of an optical network monitoring apparatus, system, and method are described herein, and are expected to be of particular advantage when implemented to correlate downstream devices in the network to optical splitter ports with which they are associated. Optical networks are useful as, for example, PONs (passive optical networks) and similar access networks and data centers.

Figure 1:
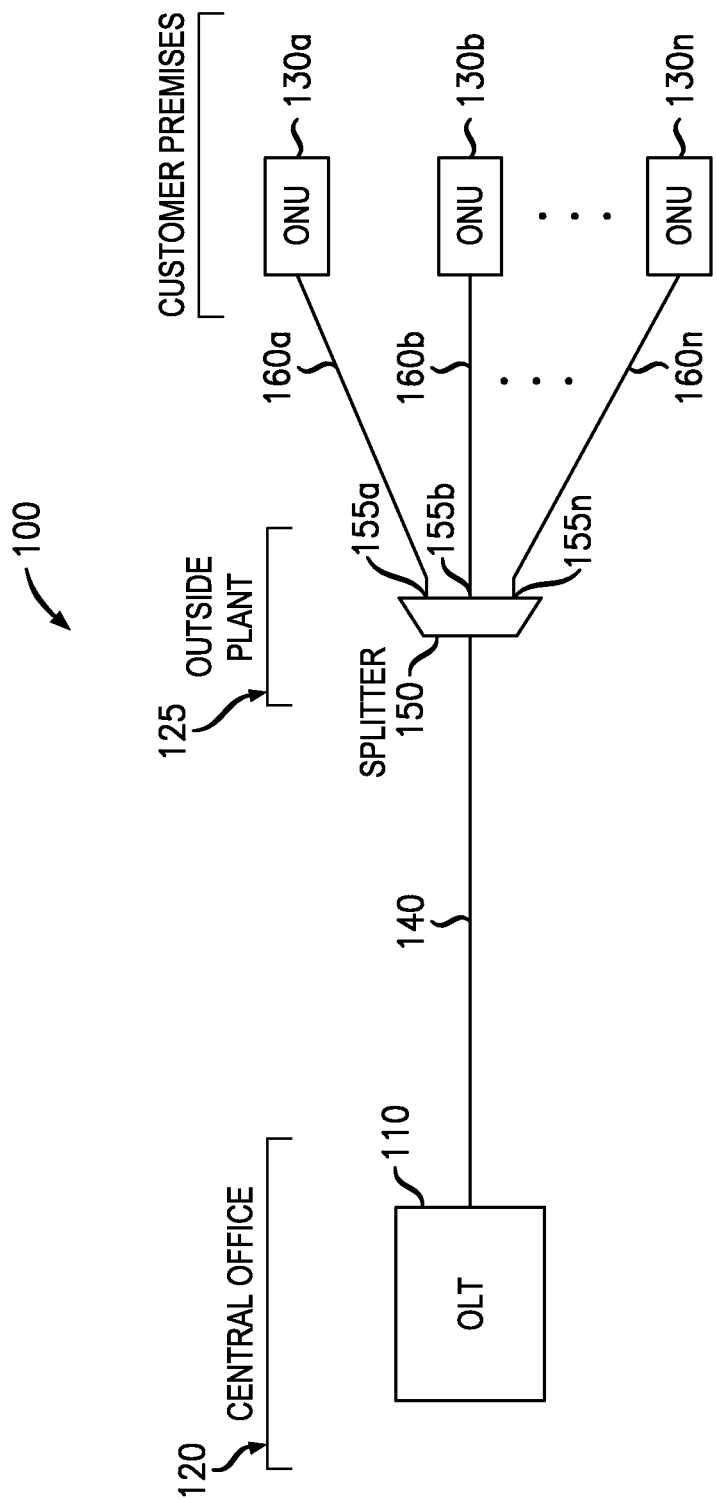
FIG. 1 simplified block diagram illustrating selected components of an exemplary PON (passive optical network) in which embodiments of the present invention may be advantageously implemented.

FIG. 1 is a simplified block diagram illustrating selected components of an exemplary PON (passive optical network) 100 in which embodiments of the present invention may be advantageously implemented. Note that PON 100 may, and in many implementations will, include additional components, and the configuration shown in FIG. 1 is intended to be exemplary rather than limiting.

In the example of FIG. 1, the network 100 includes an OLT (optical line terminal) 110, typically located at a CO (central office) 120. The OLT 110 communicates with ONUs (optical network units) 130a, 130b . . . 130n using an optical source via an optical path such as a fiber optical cable 140. Downstream data from the OLT 110 are addressed to one or more of the ONUs 130, each of which is configured to recognize data addressed to it. The optical cable 140 connects to a splitter/combiner 150 (or for convenience, simply "splitter").

The splitter 150 divides the downstream optical signal from the OLT 110 between a number of downstream ports, for example ports 155a, 155b . . . 155n. From the splitter ports, the divided signal is carried to ONUs 130a, 130b . . . 130n via access fibers 160a, 160b . . . 160n. Each ONU 130 may also transmit upstream data to the OLT 110 via the access fibers 160a, 160b . . . 160n. Optical signals from each ONU 130 are combined by the splitter 150 and propagate from there to the OLT 110 via optical cable 140.

As used herein, "ONU" is intended to be broadly construed to include ONTs (optical network terminals) and other CPE (customer premises equipment). In some networks (not shown), other downstream devices, for example another optical splitter/combiner, may be present on the optical path as well. Note that not all access fibers in a network are connected to an authorized downstream device, but are generally available should the need arise to do so. Naturally, no upstream transmissions are expected on idle access fibers.

For those access fibers that are connected to ONUs (or other downstream devices), the service provider may need to identify the specific port 155 with which a particular ONU 130 is in communication, for example, an when end-user of one of the ONUs 130 experiences a service disruption. Sometimes the port is identified in records generated when the system 100 is installed, maintained or upgraded. Often, however, such records do not exist or are inaccurate, and the particular port 155 associated with the affected ONU 130 cannot be identified without a personal inspection by a service technician to the site of the splitter 150 and/or the affected ONU 130 or its associated demarcation point (not shown).

If an incorrect port is disconnected during network servicing, however, service may be disrupted to a user other than the intended user. In some cases the splitter 150 is located in an outside plant 125 (for example, a street cabinet) tens of kilometers from the CO 120, which itself may be some distance from the affected ONU 130. A coordinated test of the ONU 130 and identification of a desired splitter port 160 conventionally typically requires a two-person team, for example one person located at the site of the splitter 150, and one person located at the site of the ONU 130 of interest. (Each ONU, of course, is typically located at a different customer premises.) Thus, the service call may be time-consuming and expensive.

Figure 2:
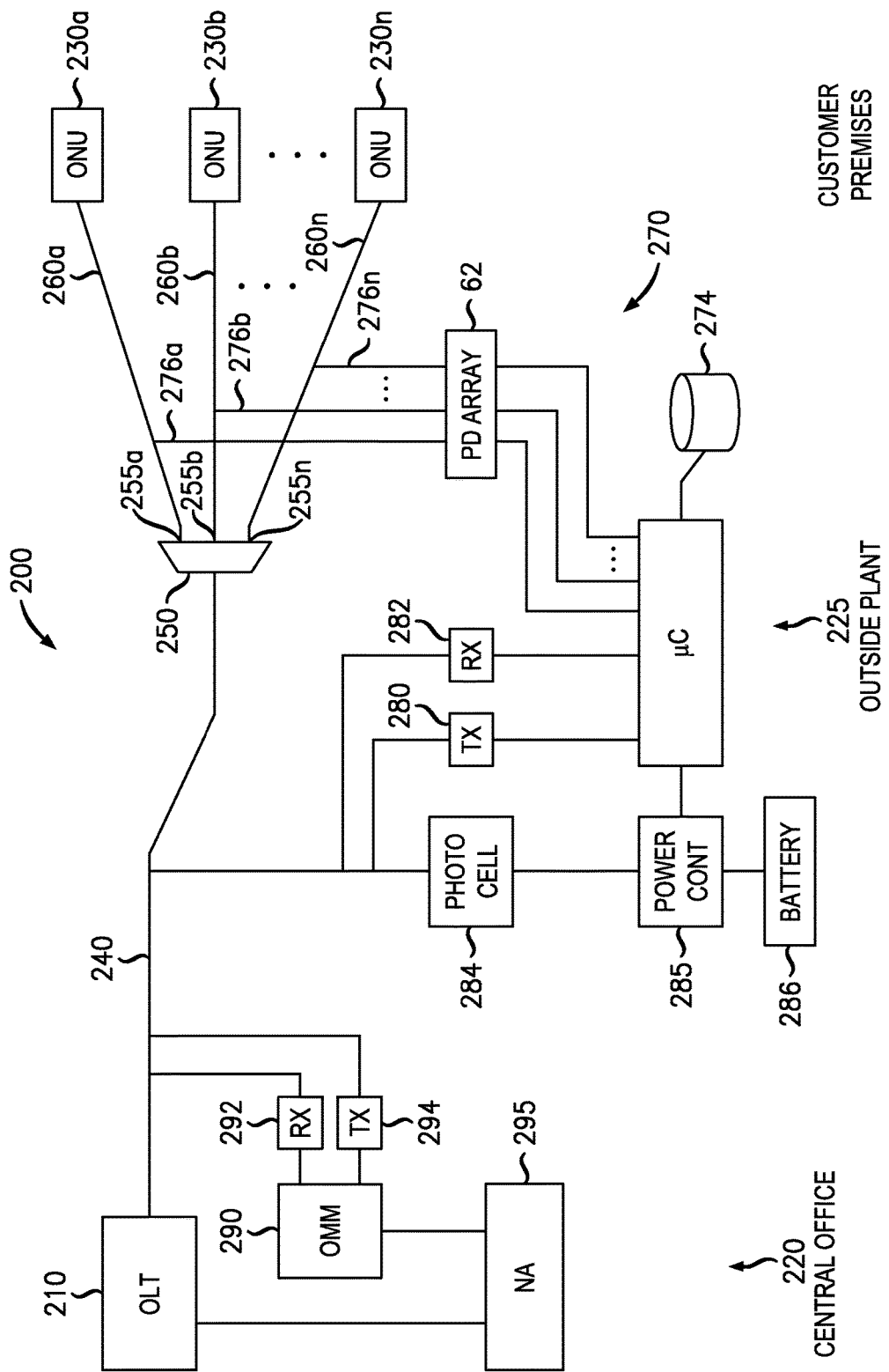
FIG. 2 is a simplified block diagram illustrating selected components of a PON implementing an embodiment of an ISM (intelligent splitter monitor)

FIG. 2 is a simplified block diagram illustrating selected components of a PON 200 implementing an embodiment of an ISM (intelligent splitter monitor). Again, note that PON 200 may, and in many implementations will, include additional components, and the configuration shown in FIG. 2 is intended to be exemplary rather than limiting.

In the embodiment of FIG. 2, OLT 210 is resident in CO 220, and is in optical communication with ONUs 230a, 230b . . . 230n via feeder fiber 240, optical splitter 250, and access fibers 260a, 260b . . . 260n, which are each associated with a respective one of splitter ports 255a, 255b . . . 255n.

An ISM (intelligent splitter monitor) 270 is implemented in PON 200 and associated with optical splitter 250. In this embodiment, ISM 270 includes a microcontroller 272 in communication with a memory device 274 (optional). Both are preferably implemented in hardware or software instructions executing on hardware, or a combination of both. Tap couplers 276a, 276b . . . 276n and photodiode array 278 are used to detect upstream traffic and identify the downstream splitter port with which it is associated.

In this embodiment, ISM 270 also includes a transmitter 280 and receiver 282 for communicating with network nodes in, for example, a central office. This communication is typically through not necessarily by optical transmission, as illustrated in FIG. 2. As is shown there, the ISM preferably communicates with the CO 220 over optical cable 240. The transmitter 280 and receiver 282 facilitate, for example, the reception of instructions at the ISM 270 and the reporting of monitoring results.

Here is noted that the ISM 270 is preferably implemented in hardware, and in a particularly preferred embodiment on a single chip such as a PIC along with the optical splitter/combiner 250. As such there will be a demarcation or port between an actual optical fiber cable and another portion of the optical communication path, such as on the chip itself, but these details are largely omitted from FIG. 2 for clarity. Where optical connections are evident from the drawing but not shown in detail, they may in implementation be supplied by devices now or then known in the art.

In the embodiment of FIG. 2, ISM 270 is powered in whole or in part by light transmitted from the CO 220. For this purpose ISM 270 includes a photocell 284 for converting the light energy from the CO into electrical energy for storage in rechargeable battery 286. Power controller 285 controls the recharging of battery 286 and use of the power by microcontroller 272. In some implementations, a secondary power source (not shown) may be provided for use if necessary.

In this embodiment, operation of the ISM 270 is controlled by a network analyzer 245, usually located within the CO 220. In most implementations, the network analyzer 245 will have other functions as well. In the context of the present invention, network analyzer 245 directs the OLT 210 to control traffic, for example directing specific ONUs to temporarily silence upstream transmissions, and to power the ISM 270. In this embodiment, network analyzer 295 also coordinates with OMM 290, which communicates with ISM 270 via receiver 292 and transmitter 294. OMM 290 may, for example, direct the monitoring cycles performed by ISM 270 and receive the monitoring reports.

It should be noted that the configuration and function of the components of PON 200 described herein may vary according to the implementation, for example functions here allocated to one particular component may in some cases be performed by another.

Figure 3:
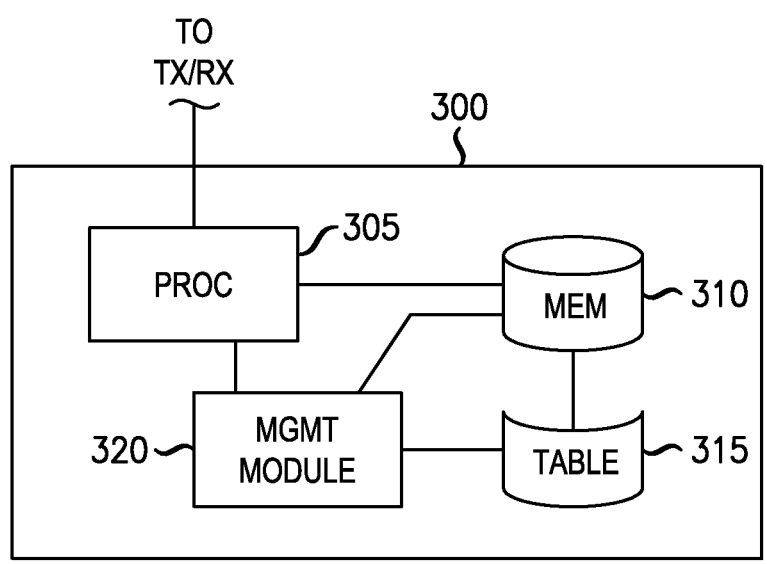
FIG. 3 is a simplified block diagram illustrating selected components of a network node according to an embodiment of the present invention.

FIG. 3 is a simplified block diagram illustrating selected components of a network node 300 according to an embodiment of the present invention. In this embodiment, the network node serves a management function with respect to network monitoring. In this embodiment, the network node 300 includes a processor 305 and a memory device 310. Processor 305 and memory device 310 are implemented in hardware or software instructions executable on a hardware platform or both. Memory device 310 is non-transitory in the sense of not being wholly embodied in a propagating signal, unless explicitly stated to the contrary in a particular embodiment. In a preferred embodiment, processor 305 is configured provide the management function by executing instructions and data stored on memory device 310.

In the embodiment of FIG. 3, network node also includes correlation table 315 for tracking the downstream devices operational on the network. Preferably the table may be used to create a sequential list of some or all of these devices, and to keep track (incrementally if applicable) of those downstream splitter ports through which the network node is communicating with one (or in some cases a number of) downstream devices. As will be explained below, incremental tracking may involve associating or disassociating each device with in the table with several splitter ports until subsequent monitoring cycles, as necessary, permit a unique (or at least satisfactory) association.

In the embodiment of FIG. 3, the network node also includes a correlation module 320 for managing the operations of a correlation cycle including selecting sets and subsets of devices to be enabled and disabled for selected monitoring cycles, as explained in more detail below, for directing operations of an ISM associated with the optical splitter, and for receiving monitoring reports from the ISM and updating the correlation table 315. Correlation table 315 and correlation module 320 are implemented in hardware or software instructions executable on a hardware platform or both unless explicitly stated to the contrary in a particular embodiment.

Note that other components may and often are present in network node 300 as well. In addition, some of the components may be divided in some implementations into separate modules or alternatively combined. The modules of the network node 300 may reside in a single physical location or be distributed among more than one, for example the OMM 290 and the network analyzer 295 shown in FIG. 2.

In preferred embodiments, network node 300 is configured to perform one or more of the methods described herein, for example those described below in reference to FIGS. 4 and 5.

Figure 4:
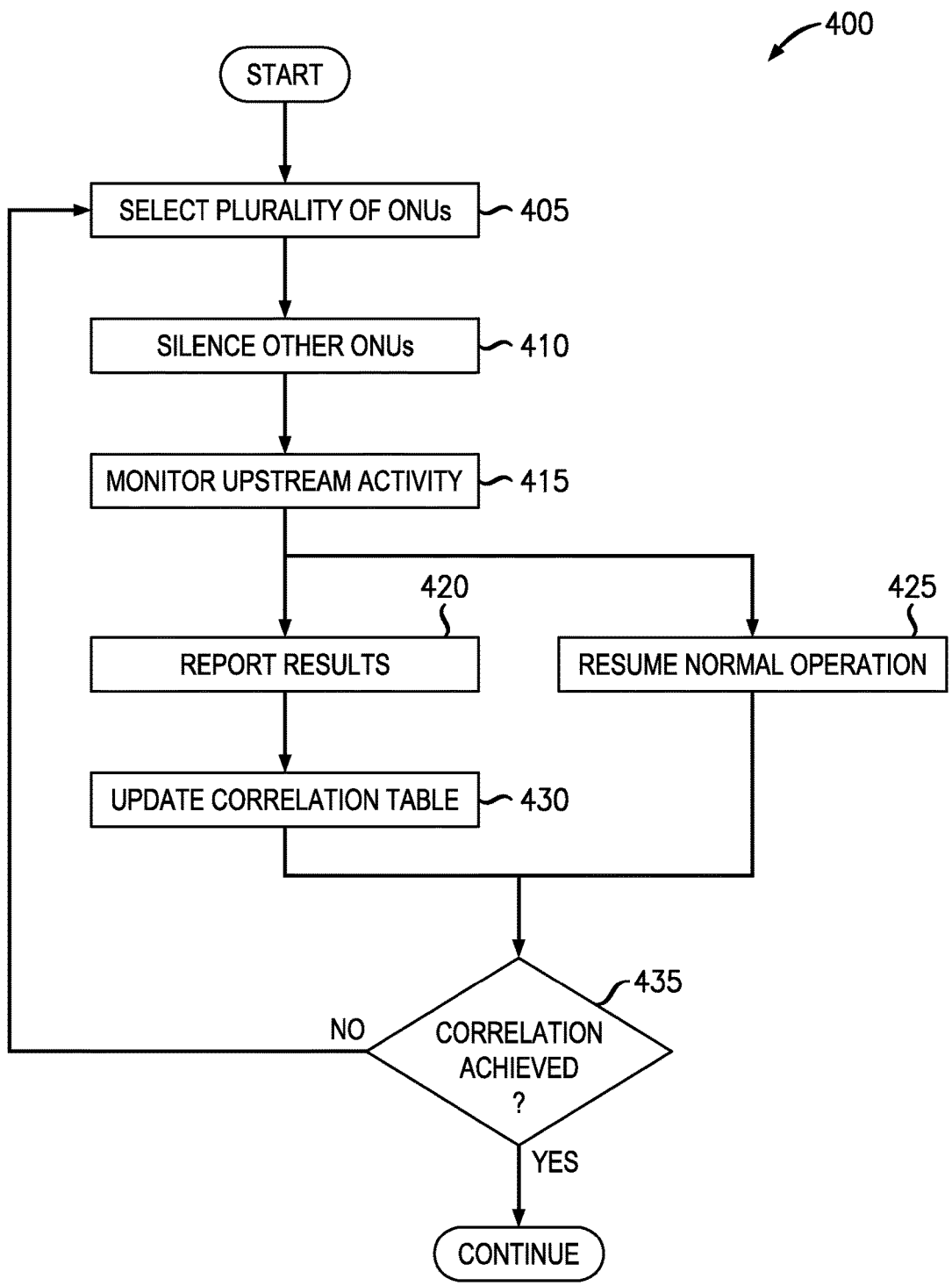
FIG. 4 is a flow diagram illustrating a method of optical-network monitoring according to an embodiment of the present invention.

FIG. 4 is a flow diagram illustrating a method 400 of optical-network monitoring according to an embodiment of the present invention. This embodiment will for convenience be described in terms of a PON having a plurality of ONUs in optical communication with a central office via an optical splitter, although the invention is applicable in other optical environments as well. At START it is presumed that the necessary components are available and operational according to at least this embodiment. In particular, it is presumed that an ISM has been provided and activated, for example the ISM depicted in FIG. 2. The process then begins with selecting (405) a plurality (but not all) of ONUs and directing (410), un-selected ONUs to cease upstream transmissions on the PON. In the context of a PON, such directions may be accomplished using PLOAM (physical layer operations, administration, and maintenance) messages.

In this embodiment, following the silencing of un-selected ONUs, the ISM monitors (step 415) for upstream activity on the downstream (ONU-facing) ports of the optical splitter. Note that in most implementations, the communication channel associated with each downstream splitter port is monitored. The monitoring operation is preferably performed as quickly as possible, but needs to be long enough in duration to provide a reliable certainly that all active ports associated with a selected ONU have been identified. The results of the monitoring are then reported (step 420), in most cases by the ISM to a managing network node in the CO such as OMM 290 depicted in FIG. 2. If necessary, the un-selected ONUs are then directed (step 425) to resume normal operation.

Note that as used herein, "selected" devices refer to those to be left fully operational during a monitoring cycle while "unselected" devices are directed to temporarily cease upstream transmissions. In actual practice, of course, the "selected devices" to be left fully operational may be "selected" as that term is used here and in the claims by "selecting" other devices to be to be silenced.

The reported results are used to update (step 430) a correlation table, for example in an OMM. The correlation table normally includes all of the ONUs that have been identified as operating on the PON and a notation or flag associating or disassociating each ONU with particular ports. The selected ports referred to above, for example, may but are not necessarily associated with ports that were active during the monitoring cycle of steps 410 to 425. Unselected ONUs may of course be disassociated from those ports. A single monitoring cycle may not, and in most implementations will not, be able to uniquely correlate all ONUs with a particular port.

In the embodiment of FIG. 4, a determination (step 435) is then made as to whether a correlation of operating ONUs to downstream optical splitter ports has been achieved. In most cases, the goal will be to achieve a full correlation, that is, a unique one to one correspondence (sometimes referred to as a "bijective assignment") of ONUs to splitter ports, but in some implementations, this may not be necessary (for example if a determination can be made as to one ONU of particular interest). In this embodiment, the determination is made by examining the correlation table.

If it is determined at step 435 that a satisfactory correlation has been achieved, then the process continues, for example, by allowing the ISM to enter sleep mode until a need to update or confirm the correlations occurs or a period of time has passed if a standard monitoring scheduled has been established (not separately shown). If, on the other hand, it is determined at step 435 that correlation has not been achieved, the process returns to step 405 for the selection of another plurality of ONUs and a repeat of the steps for directing (step 410) unselected ONUs to cease upstream transmission, monitoring downstream splitter ports (step 415), reporting (step 420), updating the correlation table (step 430) and determining (step 435) if a correlation has been achieved. Of course, if necessary, the ONUs are again directed (step 425) to return to normal operation as well.

As should be apparent, the selection process at step 405 after a determination that correlation has not been achieved should select a different subset of ONUs than has been previously selected (in this correlation cycle), otherwise in almost all cases the monitoring results will simply be replicated. A preferred methodology for making such selections will be described below.

Figure 5:
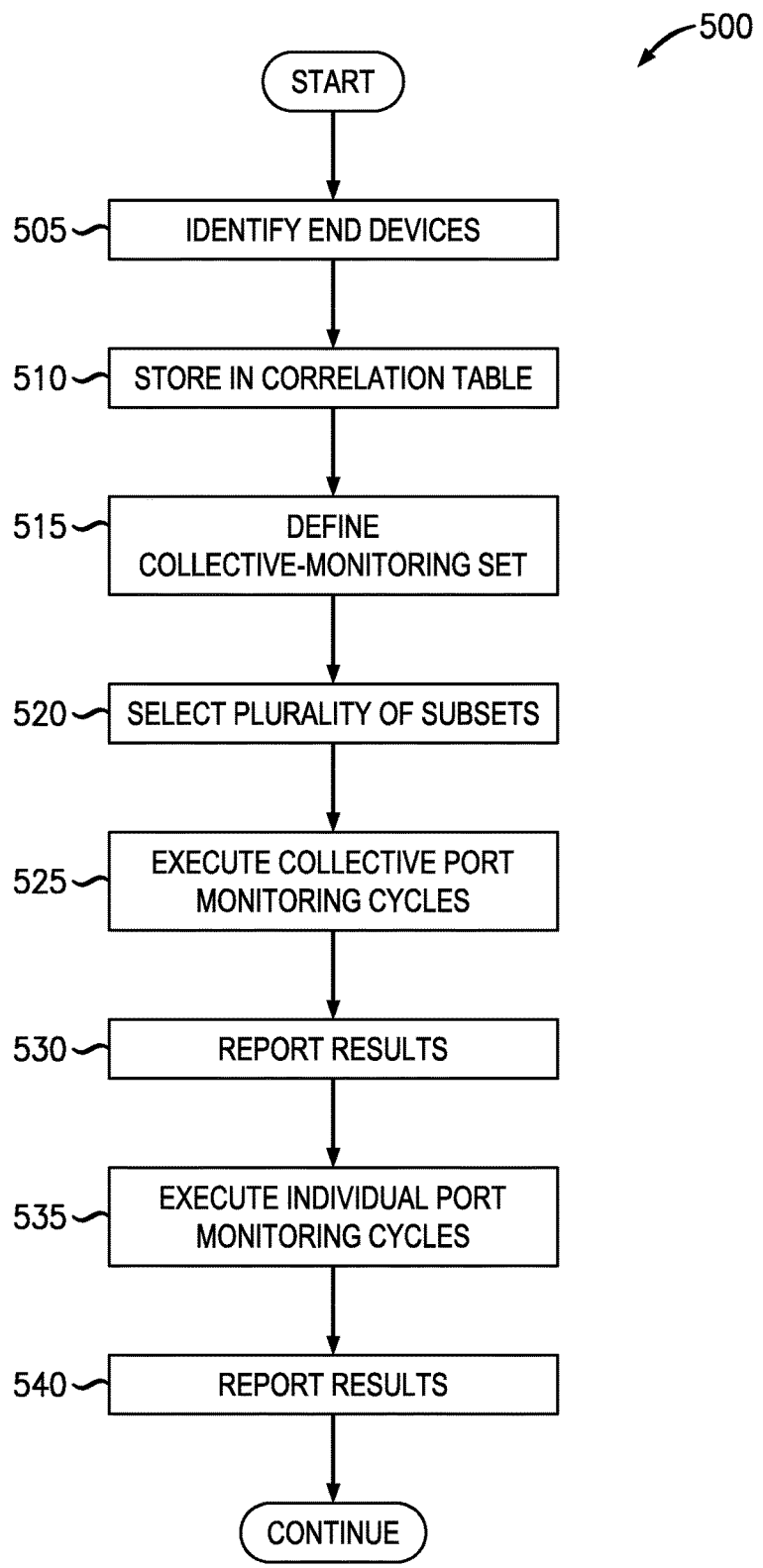
FIG. 5 is a flow diagram illustrating a method of optical-network monitoring according to an embodiment of the present invention.

FIG. 5 is a flow diagram illustrating a method 500 of optical-network monitoring according to an embodiment of the present invention. At START it is presumed that the necessary components are available and operational according to at least this embodiment. In particular, it is presumed that an ISM has been provided and activated, for example the ISM depicted in FIG. 2.

The process according to this embodiment then begins with determining (step 505) the identity of end devices that are active on the network. In normal operation for many optical networks, such as a PON, a network node such as an OLT will communicate with each of the end devices (such as ONUs) operationally connected to one of the access fibers or other optical communication channels downstream of the optical splitter in question (see, for example, FIGS. 1 and 2), beginning with some form or authorization, recognition, or ranging protocol. The identity of each operational end device is obtained as part of this process and may be stored (step 510) in a correlation table.

The process according to this embodiment then continues with defining (step 515) a collective-monitoring set. The collective-monitoring set consists of at least a portion of the plurality of downstream devices as well as any dummy downstream devices necessary to give the set $2^n$ members, wherein n is a positive integer. The collective-monitoring set preferably includes all of the downstream devices that are to be collectively monitored and correlated in this correlation cycle. In this preferred embodiment, the collective-monitoring set does not include those end devices that will be individually monitored and correlated (as will be discussed below). It may also exclude devices for which a port association is somehow known, or on the other hand not desired at this time.

The collective-monitoring set may be identified or stored (not separately shown), for example in a correlation table. In effect, the collective monitoring set so identified or stored forms a sequential listing of $2^n$ devices (including dummy devices) to be collectively monitored in a particular correlation cycle.

In the embodiment of FIG. 5, the process then continues with selecting (step 520) a plurality of subsets from the collective-monitoring set, with each subset having more than one but less than all of the end devices in the collective-monitoring set. In preferred embodiments, each subset includes one-half of the end devices in the collective-monitoring set. A plurality of ports monitoring cycles, each applying a different one of the plurality of subsets, is then executed (step 525).

In this embodiment, each port monitoring cycle includes (not separately shown) directing those end devices not selected in the respective subset to cease upstream transmissions and monitoring upstream traffic. As mentioned above, the monitoring may be performed by an ISM which detects those downstream splitter ports that are active during a particular port monitoring cycle, that is, those that are receiving upstream transmissions from end devices.

In the embodiment of FIG. 5, the monitoring results are then reported (step 530). Note that the monitoring results may be reported after each port measurement cycle, or at the end of the correlation cycle when all desired monitoring has been completed, or at any time in between. In this embodiment, it may presumed that the unselected end devices are directed to cease upstream transmissions only for a limited duration, that is, long enough for the monitoring to be properly performed, and therefore do not need to be directed to resume normal upstream operations. Alternatively, they may be affirmatively directed (not shown in FIG. 5) to continue after each monitoring cycle. The end devices may of course continue to receive downstream transmissions throughout the process, absent some reason for directing them otherwise.

It is here noted that if the subsets for the port measurement cycles are properly selected, the number of port measurement cycles may be anticipated. Preferred processes for selecting the subsets from the collective-monitoring set follows.

In a preferred embodiment, a first selected subset includes only the first half of the end devices in the collective-monitoring set—"first half" referring for convenience to the sequential listing mentioned above. A second subset may then include only the first half of these and the first half of those not in the first subset. Subsequent subsets are selected in the same fashion, selecting the first half of each selected group and the first half of each unselected group in the previous subset. When this method is used, $\log_2(n)$ subsets will usually be needed for complete correlation of N devices. An example for N=8 follows (with end devices indicated by sequence numbers; actually device IDs may be stored in the table but are not shown here).

| Device | $1^{st}$ subset | $2^{nd}$ subset | $3^{rd}$ subset |
|---|---|---|---|
| 0 | • | • | • |
| 1 | • | • |   |
| 2 | • |   | • |
| 3 | • |   |   |
| 4 |   | • | • |
| 5 |   | • |   |
| 6 |   |   | • |
| 7 |   |   |   |

Note that while the subsets are selected in a certain order for convenience in description, they may be used for any measurement cycle, provided each subset is used only once in the correlation cycle. Note also that the subset-forming process may be varied somewhat from the description above, for example by selecting the second half of a previous group rather than the first, but some consistency is needed to ensure that only the minimum number of subsets is needed for correlation.

In another preferred embodiment, subset selection may be described in a different way by assigning to the list of devices a $\log_2(n)$-bit binary sequence number. The first and subsequent subsets are then formed by selecting the devices associated with a "0" value in the respective ($1^{st}$, $2^{nd}$, etc.) column of the binary sequence number. As above, of course, in performing the correlation, the subsets thus formed could be cycled through in any order, and the selection could be based, for example, on "1" values rather than "0".

| Device |   | $1^{st}$ subset | $2^{nd}$ subset | $3^{rd}$ subset |
|---|---|---|---|---|
| 0 | 000 | • | • | • |
| 1 | 001 | • | • |   |
| 2 | 010 | • |   | • |
| 3 | 011 | • |   |   |
| 4 | 100 |   | • | • |
| 5 | 101 |   | • |   |
| 6 | 110 |   |   | • |
| 7 | 111 |   |   |   |

In yet another preferred embodiment, this process may be expressed mathematically as follows, referring to the sequential device numbers for N devices (N=$2^n$). In this context, as above, "group" refers to devices that are directly adjacent to each other in the sequential listing. Note that in the last selected subset, the group size is always 1, that is, a single device. Note also that for this purpose the first and last devices (of the whole list or any group) are considered adjacent to each other.

| group | 1$^{st}$ subset | 2$^{nd}$ subset | 3$^{rd}$ subset | ... | last subset |
|---|---|---|---|---|---|
| a | 0 ... N/2 – 1 | 0 ... N/4 – 1 | 0 ... N/8 – 1 | | device 0 |
| b | | N/2 ... N/2 + N/4 – 1 | +N/4 ... N/4 + N/8 – 1 | | device 2 |
| c | | | N/2 ... N/2 + N/8 – 1 | | device 4 |
| d | | | N/4 + N/4 ... N/2 + N/4 + N/8 – 1 | | device 6 |
| ... (last) | | | ... | | ... device N – 2 |

In any case, note that where N is greater than m, the number of actual downstream devices in the collective-monitoring set, the selection proceeds as above acknowledging that some of the listed "devices" will be dummy devices. Naturally, dummy devices are not actual devices and there is no need to direct dummy devices to cease or resume upstream transmissions. As should be apparent, the selection of an N large enough to include all m devices but no larger is the most efficient approach.

Note also that in some cases, m, the number of active downstream devices to be collectively monitored in a given correlation cycle, may not include all downstream devices active on the optical network. This may be the case where, for example, a unique correlation has already been made between a downstream device and a downstream splitter port or where it is more efficient to correlate one or more devices using another method. This latter case may occur, for example, where a sequential listing including all active downstream devices would include a large number of dummy devices.

If the collective-monitoring set does not include the total number of active downstream devices, measurement cycles with only one device silenced may be used to perform a complete correlation. In the embodiment of FIG. 5, any port cycles for the individual-monitoring subsets (each including one device) are executed (step 535) after the collective-monitoring port cycles. The results of this monitoring are then reported (step 540). It is noted again, however, that the reporting step or steps may be performed as desired in a given implementation.

It is also noted that the port correlation of a correlation cycle could be accomplished entirely through the (sole) use of individual monitoring subsets, but the techniques described herein are expected in most implementations to be much more efficient, requiring fewer monitoring cycles in most cases. This may be of great advantage where, for example, the ISM and optical splitter are in an outside plant where power is not available except as supplied from the CO (see FIG. 2).

In this embodiment, the process then continues, for example, by allowing the ISM to enter sleep mode until a need to update or confirm the correlations occurs or a period of time has passed if a standard monitoring scheduled has been established (not separately shown).

Note that the sequences of operation illustrated in FIGS. 4 and 5 represent exemplary embodiments; some variation is possible without departing from the claims as they are recited. For example, additional operations may be added to those shown in FIGS. 4 and 5, and in some implementations one or more of the illustrated operations may be omitted. In addition, the operations of the method may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of monitoring an optical network comprising a plurality of downstream devices in optical communication with a network node via an optical splitter, the method comprising:
    selecting a plurality of subsets of downstream devices, wherein each subset of the plurality of subsets comprises one-half of the downstream devices in a collective-monitoring set consisting of at least a portion of the plurality of downstream devices and any dummy downstream devices necessary to give the set $2^n$ members, wherein n is a positive integer; and wherein the selecting a plurality of subsets of downstream devices comprises:
        selecting a first subset; and
        selecting subsequent subsets by selecting one-half of each previously selected group of downstream devices and one-half of each previously unselected group of downstream devices, until $\log_2(n)$ subsets have been selected;
    executing a port monitoring cycle for each subset of the plurality of subsets, each executed port monitoring cycle comprising:
        directing un-selected downstream devices to cease upstream transmissions; and
        monitoring upstream activity on downstream splitter ports to determine which ports are receiving upstream transmissions; and
    reporting the monitoring results.

2. The method of claim 1, wherein the reporting is performed after the results are obtained in each port monitoring cycle.

3. The method of claim 1, further comprising executing a port monitoring cycle for one or more individual downstream devices, each port measurement cycle for an individual downstream device comprising:
    directing the selected device to cease upstream transmissions;
    monitoring upstream activity on downstream splitter ports; and
    reporting the results.

4. The method of claim 1, further comprising directing downstream devices to resume normal operation.

5. The method of claim 1, further comprising, prior to selecting a plurality of subsets, determining an identity of downstream devices operational on the optical network.

6. The method of claim 1, wherein the optical network is a PON (passive optical network) and the downstream devices are ONUs (optical network units).

7. The method of claim 1, wherein the measuring and reporting is performed by an ISM (intelligent splitter monitor).

8. The method of claim 1, further comprising updating a correlation table with the reported results.

9. A network node for an optical network, comprising:
a processor;
a memory device in communication with the processor having stored therein program instructions that when executed by the processor cause the network node to:
select a plurality of subsets of downstream devices, wherein each subset of the plurality of subsets comprises one-half of the downstream devices in a collective-monitoring set consisting of at least a portion of the plurality of downstream devices and any dummy downstream devices necessary to give the set $2^n$ members, wherein n is a positive integer; and wherein the selecting a plurality of subsets of downstream devices comprises:
  selecting a first subset; and
  selecting subsequent subsets by selecting one-half of each previously selected group of downstream devices and one-half of each previously unselected group of downstream devices, until $\log_2(n)$ subsets have been selected;
execute a port monitoring cycle for each subset of the plurality of subsets, each executed port monitoring cycle comprising:
  directing un-selected downstream devices to cease upstream transmissions; and
  monitoring upstream activity on downstream splitter ports to determine which ports are receiving upstream transmissions; and
reporting the monitoring results.

10. The network node of claim 9, where the program instructions when executed by the processor further cause the monitoring-results reporting to be performed after the results are obtained in each port monitoring cycle.

11. The network node of claim 9, where the program instructions when executed by the processor further cause the network node to execute a port monitoring cycle for one or more individual downstream devices, each port measurement cycle for an individual downstream device comprising:
  directing the selected device to cease upstream transmissions;
  monitoring upstream activity on downstream splitter ports; and
reporting the results.

12. The network node of claim 9, where the program instructions when executed by the processor further cause the network node to direct downstream devices to resume normal operation.

13. The network node of claim 9, where the program instructions when executed by the processor further cause the network node to determine an identity of downstream devices operational on the optical network prior to selecting the plurality of subsets.

14. The network node 9, wherein the optical network is a PON (passive optical network) and the downstream devices are ONUs (optical network units).

15. The network node 9, wherein the measuring and reporting is performed by an ISM (intelligent splitter monitor).

16. The network node 9, further comprising a correlation table that is updated with reported results.

* * * * *